United States Patent
McVey

(10) Patent No.: US 9,541,028 B2
(45) Date of Patent: Jan. 10, 2017

(54) MANAGING LOW PRESSURE TURBINE MAXIMUM SPEED IN A TURBOFAN ENGINE

(75) Inventor: William J. McVey, North Granby, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1928 days.

(21) Appl. No.: 12/442,128

(22) PCT Filed: Oct. 12, 2006

(86) PCT No.: PCT/US2006/039947
§ 371 (c)(1),
(2), (4) Date: Mar. 20, 2009

(87) PCT Pub. No.: WO2008/063153
PCT Pub. Date: May 29, 2008

(65) Prior Publication Data
US 2010/0000199 A1  Jan. 7, 2010

(51) Int. Cl.
*F02K 1/15* (2006.01)
*F02K 1/06* (2006.01)
*F02K 3/06* (2006.01)

(52) U.S. Cl.
CPC . *F02K 1/15* (2013.01); *F02K 1/06* (2013.01); *F02K 3/06* (2013.01); *F05D 2270/021* (2013.01); *F05D 2270/304* (2013.01)

(58) Field of Classification Search
CPC .............. F02K 3/04; F02K 3/06; F02K 3/062; F02K 3/075; F02K 1/06; F02K 1/10; F02K 1/12; F02K 1/1207; F02K 1/123; B64C 9/38
(Continued)

(56) References Cited

U.S. PATENT DOCUMENTS 3,729,957 A * 5/1973 Petrie et al. .................. 60/226.1
3,797,233 A * 3/1974 Webb et al. .................... 60/791
(Continued)

FOREIGN PATENT DOCUMENTS

EP  0 926 332  6/1999

OTHER PUBLICATIONS

Zalud, Todd. Gears Put a New Spin on Turbofan Performance. Machine Design. vol. 70 Issue 20, p. 104. Nov. 1998.*
(Continued)

*Primary Examiner* — Phutthiwat Wongwian
*Assistant Examiner* — Marc Amar
(74) *Attorney, Agent, or Firm* — Carlson, Gaskey & Olds, P.C.

(57) ABSTRACT

A turbofan engine control system for managing a low pressure turbine speed is provided. The turbofan engine control system includes a low spool having a low pressure turbine that are housed in a core nacelle. The low pressure turbine is adapted to rotate at a speed and includes a maximum design speed. A turbofan is coupled to the low spool. A fan nacelle surrounds the turbofan and core nacelle and provides a bypass flow path. The bypass flow path includes a nozzle exit area. A controller is programmed to command a flow control device adapted to effectively decrease the nozzle exit area in response to a condition. Reducing the nozzle exit area, either physically or otherwise, maintains the speed below the maximum design speed.

13 Claims, 3 Drawing Sheets

(58) Field of Classification Search
USPC ............ 60/226.1, 226.3, 242, 233, 791, 792
See application file for complete search history.

(56) References Cited

U.S. PATENT DOCUMENTS

| | | | | |
|---|---|---|---|---|
| 3,829,020 | A * | 8/1974 | Stearns | 239/265.13 |
| 3,854,287 | A * | 12/1974 | Rembold | 60/236 |
| 4,010,608 | A * | 3/1977 | Simmons | 60/226.3 |
| 4,159,625 | A * | 7/1979 | Kerr | 60/204 |
| 4,242,864 | A | 1/1981 | Cornett et al. | |
| 4,258,545 | A | 3/1981 | Slater | |
| 4,467,599 | A * | 8/1984 | Moore | 60/39.093 |
| 5,048,285 | A * | 9/1991 | Schmitt et al. | 60/204 |
| 5,261,227 | A | 11/1993 | Giffin, III | |
| 5,433,674 | A | 7/1995 | Sheridan et al. | |
| 7,174,704 | B2 * | 2/2007 | Renggli | 60/204 |
| 2005/0039437 | A1 * | 2/2005 | Lair | 60/204 |
| 2005/0126174 | A1 * | 6/2005 | Lair | 60/771 |

OTHER PUBLICATIONS

International Search Report for PCT Application No. PCT/US2006/039947, Sep. 2, 2008.

* cited by examiner

MANAGING LOW PRESSURE TURBINE MAXIMUM SPEED IN A TURBOFAN ENGINE

This application claims priority to PCT Application Serial No. PCT/US2006/039947, filed on Oct. 12, 2006.

BACKGROUND OF THE INVENTION

This invention relates to a turbofan engine, and more particularly, the invention relates to managing the maximum speed of a low pressure turbine.

A typical turbofan engine includes low and high spools. The low spool is coupled to a turbofan and typically supports a low pressure turbine and compressor. The high spool typically supports a high pressure turbine and compressor. The spools, turbines and compressors are housed in a core nacelle. The turbofan is arranged upstream from the core nacelle. A fan nacelle surrounds the turbofan and core nacelle to provide a bypass flow path having a nozzle area through which bypass flow from the turbofan exits.

The turbines are designed to accommodate a maximum operating speed plus a margin. The engine becomes heavier and more costly as the maximum speed increases for a given turbine design. For example, the turbofan, low pressure turbine, low spool and fan containment system must be designed more robustly for a higher low pressure turbine maximum speed. Current commercial turbofan engines use fixed area nozzles that limit the ability to operate the engine to a fixed characteristic, for example maximum low pressure turbine speed. As a result, the engine must be designed for the condition requiring the maximum turbine speed during a flight envelope, even though the condition may rarely occur during typical aircraft usage.

Low bypass ratio turbofan engines are used in military fighter aircraft. These turbofan engines use variable area nozzles to balance thrust requirements, maximum rotor speed and fan stability requirements. Military fighter engines encounter maximum rotor speeds at different flight conditions compared to commercial engines. For example, military aircraft fly at maximum speed exceeding the speed of sound whereas the maximum flight speed of commercial aircraft is below the speed of sound, for example around Mach 0.8. The thrust requirement of commercial and military fighter aircraft are also significantly different.

What is needed is a turbofan engine capable of providing the needed thrust throughout the flight envelope without increasing the maximum speed of the low pressure turbine.

SUMMARY OF THE INVENTION

A turbofan engine control system for managing a low pressure turbine speed is provided. The turbofan engine control system includes a low spool having a low pressure turbine that are housed in a core nacelle. The low pressure turbine is adapted to rotate at a speed and includes a maximum design speed. A turbofan is coupled to the low spool. A fan nacelle surrounds the turbofan and core nacelle and provides a bypass flow path. The bypass flow path includes a nozzle exit area. A controller is programmed to command a flow control device adapted to effectively decrease the nozzle exit area in response to a condition. Reducing the nozzle exit area, either physically or otherwise, maintains the speed below the maximum design speed.

In operation, the turbofan engine control system detects a condition affecting a speed of a component mounted on the low spool, such as the low pressure turbine. In one example, the controller determines if the condition would cause the speed to reach an undesired speed relative to the maximum design speed for the low pressure turbine. If the condition would result in at least the undesired speed, then the nozzle exit area is reduced, which creates a backpressure on the turbofan thereby counteracting an increase in low spool speed. In this manner, the maximum design speed of the low pressure turbine is avoided.

These and other features of the present invention can be best understood from the following specification and drawings, the following of which is a brief description.

DETAILED DESCRIPTION OF THE PREFERRED EMBODIMENT

Figure 1:
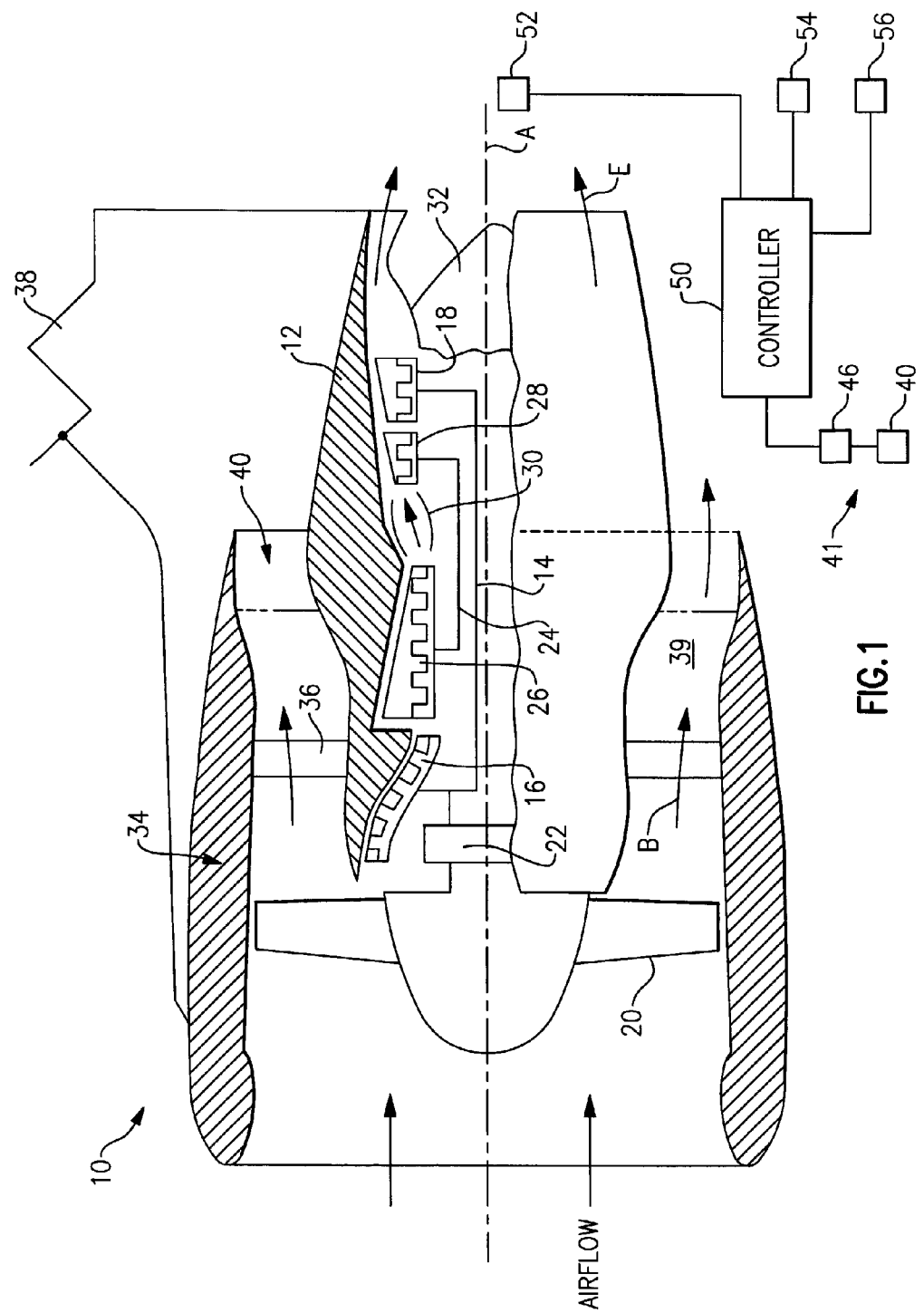
FIG. 1 is a cross-sectional view of an example turbofan engine.

A geared turbofan engine 10 is shown in FIG. 1. A pylon 38 secures the engine 10 to an aircraft. The engine 10 includes a core nacelle 12 that houses a low spool 14 and high spool 24 rotatable about an axis A. The low spool 14 supports a low pressure compressor 16 and low pressure turbine 18. In the example, the low spool 14 drives a turbofan 20 through a gear train 22. The high spool 24 supports a high pressure compressor 26 and high pressure turbine 28. A combustor 30 is arranged between the high pressure compressor 26 and high pressure turbine 28. Compressed air from compressors 16, 26 mixes with fuel from the combustor 30 and is expanded in turbines 18, 28.

In the examples shown, the engine 10 is a high bypass turbofan arrangement. In one example, the bypass ratio is greater than 10, and the turbofan diameter is substantially larger than the diameter of the low pressure compressor 16. The low pressure turbine 18 has a pressure ratio that is greater than 5, in one example. The gear train 22 is an epicycle gear train, for example, a star gear train, providing a gear reduction ratio of greater than 2.5. It should be understood, however, that the above parameters are only exemplary of a contemplated geared turbofan engine. That is, the invention is applicable to other engines.

Airflow enters a fan nacelle 34, which surrounds the core nacelle 12 and turbofan 20. The turbofan 20 directs air into the core nacelle 12, which is used to drive the turbines 18, 28, as is known in the art. Turbine exhaust E exits the core nacelle 12 once it has been expanded in the turbines 18, 28, in a passage provided between the core nacelle and a tail cone 32.

The core nacelle 12 is supported within the fan nacelle 34 by structure 36, which are commonly referred to as upper and lower bifurcations. A generally annular bypass flow path 39 is arranged between the core and fan nacelles 12, 34. The example illustrated in FIG. 1 depicts a high bypass flow arrangement in which approximately eighty percent of the airflow entering the fan nacelle 34 bypasses the core nacelle 12. The bypass flow B within the bypass flow path 39 exits the tan nacelle 34 through a nozzle exit area 40.

For the engine 10 shown in FIG. 1, a significant amount of thrust may be provided by the bypass flow B due to the high bypass ratio. Thrust is a function of density, velocity and area. One or more of these parameters can be manipulated to vary the amount and direction of thrust provided by the bypass flow B. In one example, the engine 10 includes a structure associated with the nozzle exit area 40 to change the physical area and geometry to manipulate the thrust provided by the bypass flow B. However, it should be understood that the nozzle exit area may be effectively altered by other than structural changes, for example, by altering the boundary layer, which changes the flow velocity. Furthermore, it should be understood that any device used to effectively change the nozzle exit area is not limited to physical locations near the exit of the fan nacelle 34, but rather, includes altering the bypass flow B at any suitable location.

The engine 10 has a flow control device 41 that is used to effectively change the nozzle exit area. In one example, the flow control device 41 provides the fan nozzle exit area 40 for discharging axially the bypass flow B pressurized by the upstream turbofan 20 of the engine 10. A significant amount of thrust is provided by the bypass flow B due to the high bypass ratio. The turbofan 20 of the engine 10 is designed for a particular flight condition, typically cruise at 0.8M and 35,000 feet. The turbofan 20 is designed at a particular fixed stagger angle for an efficient cruise condition. The flow control device 41 is operated to vary the nozzle exit area 40 to adjust fan bypass air flow such that the angle of attack or incidence on the fan blade is maintained close to design incidence at other flight conditions, such as landing and takeoff. This enables desired engine operation over a range of flight condition with respect to performance and other operational parameters such as noise levels. In one example, the flow control device 41 defines a nominal converged position for the nozzle exit area 40 at cruise and climb conditions, and radially opens relative thereto to define a diverged position for other flight conditions. In one example, the flow control device 41 provides an approximately 20% change in the exit nozzle area 40.

In one example, the flow control device 41 includes multiple hinged flaps 42 arranged circumferentially about the rear of the fan nacelle 34. The hinged flaps 42 can be actuated independently and/or in groups using segments 44. In one example, the segments 44 and each hinged flap 42 can be moved angularly using actuators 46. The segments 44 are guided by tracks 48 in one example.

Figure 2:
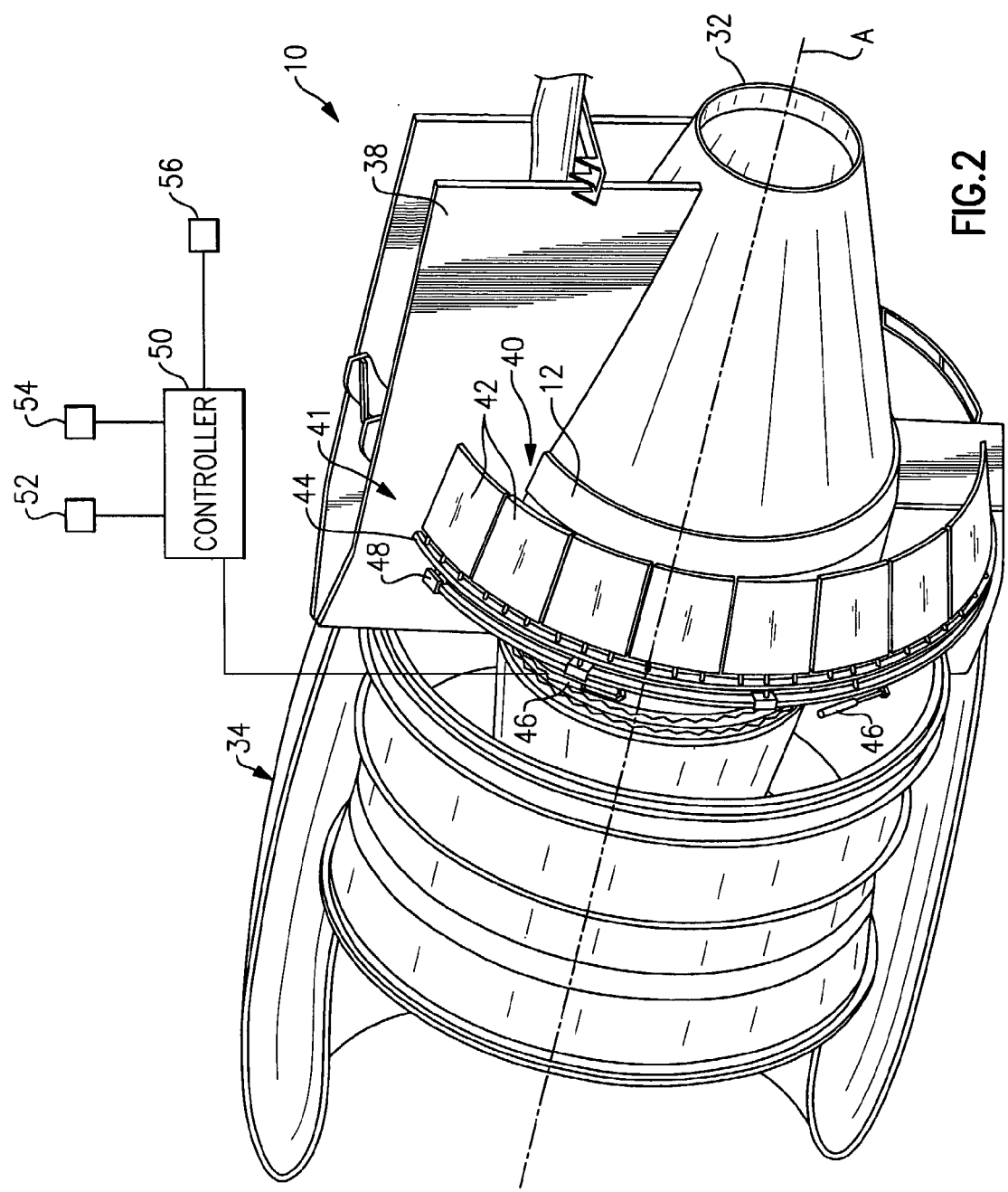
FIG. 2 is a partially broken perspective view of the turbofan engine shown in FIG. 1.

Referring to FIGS. 1 and 2, the engine 10 includes a controller 50 that commands the flow control device 41 to limit the speed of the low pressure turbine 18. However, limiting the low pressure turbine speed in a conventional turbofan engine reduces the available thrust. This can be particularly problematic for high altitude take-off conditions, which typically require the maximum thrust from the engine. Thus, reducing the low turbine speed is not possible unless the needed thrust can be achieved. The example turbofan engine and control system provides the needed thrust with a slower low pressure turbine speed than would be needed otherwise.

The controller 50 communicates with, for example, a speed sensor, altitude sensor and throttle position sensor 52, 54, 56. In the example, the speed sensor 52 provides the speed of the low pressure turbine 18, which corresponds with the speed of the low spool 14. The low pressure turbine speed can be determined directly or indirectly. The altitude sensor 54 provides information relating to the altitude of the aircraft, which is particularly relevant for take-offs from high altitude runways. The throttle position sensor 56 can communicate, for example, a full throttle position indicative of a take-off. Additional and/or different sensors can also be used.

Figure 3:
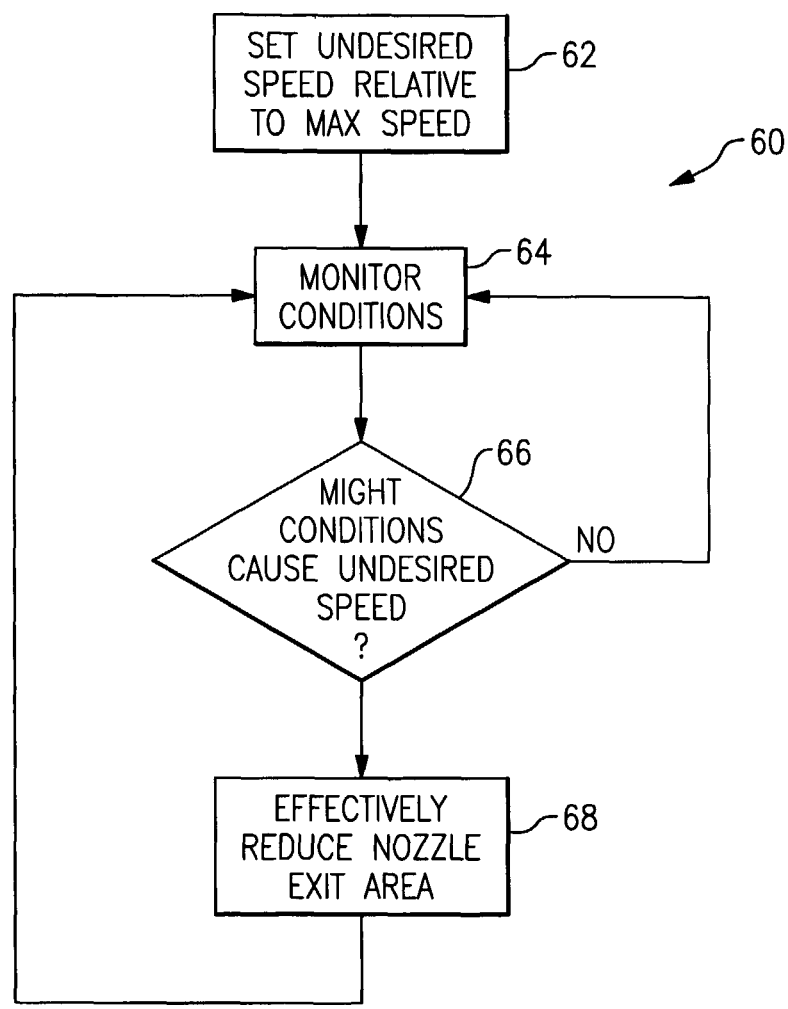
FIG. 3 is a flow chart illustrating an example turbofan engine control system.

In one example, the above information is used by the controller 50 to determine if the low pressure turbine 18 speed is approaching its maximum design speed, which is illustrated at 60 in FIG. 3. In one example, it is desirable to maintain a safety margin relative to the maximum design speed such that the operating speed of the low pressure turbine 18 is less than the maximum design speed, shown at block 62. The controller 50 monitors for various conditions using the sensors 52, 54, 56, shown at block 64. When the controller 50 determines that conditions exist for a desired thrust that would result in an undesired speed, shown at block 66 (for example, high altitude take-offs), the controller 50 commands the flow control device 41 to effectively reduce the nozzle exit area 40 (block 68). For the example shown in FIG. 2, the controller 50 commands the actuators 46 to close the flaps 42 (moving them radially inward from the position shown) to physically reduce the area of the nozzle. This control scheme can be used to limit the low pressure turbine speed, or the speed of any other component coupled to the turbofan, for any conditions desired.

Effectively reducing the nozzle exit area 40 has two effects. First, a backpressure on the turbofan 20 is increased providing resistance to its rotation. This counteracts an increase in low pressure turbine speed since the low pressure turbine 18 and turbofan 20 are coupled to one another via the low spool 14. Second, the thrust provided by the bypass flow path 39 is increased from the throttling provided by the effectively smaller nozzle exit area 40. In this manner, the example turbofan engine 10 is capable of providing the needed thrust at a reduced low pressure turbine speed as compared to conventional turbofan engines.

Although an example embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbofan engine control system for managing a low pressure turbine speed comprising:
    a low spool including a low pressure turbine housed in a core nacelle, the low pressure turbine rotatable at a speed and having a maximum design speed;
    a turbofan coupled to the low spool;
    a fan nacelle surrounding the turbofan and core nacelle and providing a bypass flow path having a nozzle exit area;
    a controller programmed to command a flow control device and effectively decrease the nozzle exit area in response to a condition that would result in at least an undesired speed of the low pressure turbine for maintaining the speed below the maximum design speed; and
    a gear train interconnecting the low spool and the turbofan for reducing a turbofan speed relative to the speed.

2. The turbofan engine control system according to claim 1, comprising a high spool rotatable relative to the low spool, the high spool supporting a high pressure compressor and high pressure turbine.

3. The turbofan engine control system according to claim 1, wherein the flow control device includes an actuator for manipulating a flap in response to the command to physically reduce the nozzle exit area.

4. The turbofan engine control system according to claim 1, comprising a speed sensor in communication with the controller for detecting the speed, the condition relating to the speed.

5. The turbofan engine control system according to claim 1, comprising an altitude sensor in communication with the controller for detecting an aircraft altitude, the condition relating to the aircraft altitude.

6. The turbofan engine control system according to claim 1, comprising a throttle position sensor in communication with the controller for detecting an engine throttle position, the condition relating to the engine throttle position.

7. A method of managing a low pressure turbine speed in a turbofan engine comprising the steps of:
   detecting a condition affecting a speed of a low pressure turbine mounted on a low spool;
   determining, by a turbofan engine control system, if the condition would cause the speed to reach an undesired speed relative to a maximum design speed for the low pressure turbine;
   effectively reducing a nozzle exit area in response to determining the condition would result in at least the undesired speed;
   wherein the turbofan engine control system comprises:
      the low spool, the low spool including the low pressure turbine housed in a core nacelle, the low pressure turbine rotatable at a speed and having the maximum design speed;
      a turbofan coupled to the low spool;
      a fan nacelle surrounding the turbofan and core nacelle and providing a bypass flow path having the nozzle exit area;
      a controller programmed to command a flow control device and effectively decrease the nozzle exit area in response to a condition that would result in at least the undesired speed of the low pressure turbine for maintaining the speed below the maximum design speed; and
      a gear train interconnecting the low spool and the turbofan for reducing a turbofan speed relative to the speed.

8. The method according to claim 7, comprising the step of detecting an aircraft altitude, the condition including the altitude.

9. The method according to claim 7, comprising the step of detecting a throttle position, the condition including the throttle position.

10. The method according to claim 7, comprising the step of detecting the speed.

11. The method according to claim 7, wherein the step of effectively reducing the nozzle exit area include reducing a physical size of the nozzle exit area.

12. The method according to claim 7, comprising the step of generating a backpressure on a turbofan after performing the step of effectively reducing the nozzle exit area.

13. The method according to claim 12, wherein the step of generating backpressure counteracts an increase the speed toward the maximum design speed.

* * * * *

UNITED STATES PATENT AND TRADEMARK OFFICE
CERTIFICATE OF CORRECTION

| | |
|---|---|
| PATENT NO. | : 9,541,028 B2 |
| APPLICATION NO. | : 12/442128 |
| DATED | : January 10, 2017 |
| INVENTOR(S) | : William J. McVey |

It is certified that error appears in the above-identified patent and that said Letters Patent is hereby corrected as shown below:

In the Claims

In Claim 13, Column 6, Line 25; after "increase" insert --in--

Signed and Sealed this
Fourth Day of July, 2017

Joseph Matal
*Performing the Functions and Duties of the*
*Under Secretary of Commerce for Intellectual Property and*
*Director of the United States Patent and Trademark Office*